United States Patent [19]

Samejima et al.

[11] Patent Number: 4,984,420
[45] Date of Patent: Jan. 15, 1991

[54] DUMPING APPARATUS FOR GRASS CATCHER

[75] Inventors: Kazuo Samejima; Hiroaki Kawakita; Yoshikazu Togoshi; Yoshiaki Matsuda; Takao Sakatsuji, all of Osaka, Japan; Colin Fulford, Compton, Calif.

[73] Assignee: Kubota, Ltd., Osaka, Japan

[21] Appl. No.: 307,389

[22] Filed: Feb. 6, 1989

[30] Foreign Application Priority Data

Feb. 12, 1988 [JP] Japan .................................. 63-31357
Feb. 12, 1988 [JP] Japan .................................. 63-31358

[51] Int. Cl.⁵ ...................... A01D 34/70; A01D 90/10
[52] U.S. Cl. ........................................ 56/203; 56/16.6; 298/11
[58] Field of Search ................ 56/203, 202, 205, 16.6; 298/11, 23 D, 23 R, 18; 414/471, 486, 501

[56] References Cited

U.S. PATENT DOCUMENTS

| | | | |
|---|---|---|---|
| 4,327,945 | 5/1982 | Fowler | 298/11 |
| 4,487,007 | 12/1984 | Mullet et al. | 56/202 |
| 4,573,742 | 3/1986 | Tegtmeier | 298/11 |
| 4,709,541 | 12/1987 | Broman et al. | 56/16.6 |

Primary Examiner—Ramon S. Britts
Assistant Examiner—Terry Lee Melius
Attorney, Agent, or Firm—Jordan and Hamburg

[57] ABSTRACT

A dumping apparatus for a grass catcher for rearwardly inclining the grass catcher containing grass clipping to discharge the grass clippings. The apparatus includes a guide member and a movable member mounted in the guide member, a restraining member for restraining the movement of the catcher and a bracket fixed to a rear face of the catcher. A leading end of the movable member is pivoted at a longitudinally intermediate position of the bracket and a leading end of the restraining member is pivoted at a rear upper position of the bracket, whereby the grass catcher may be moved and inclined for the dumping action.

10 Claims, 8 Drawing Sheets

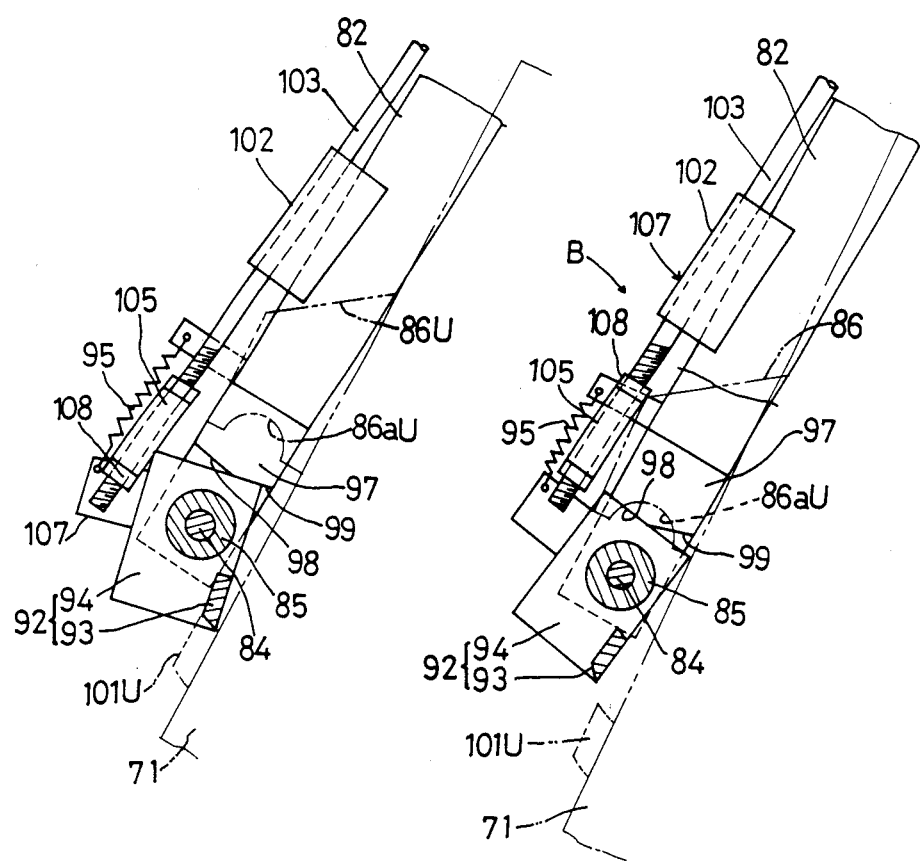

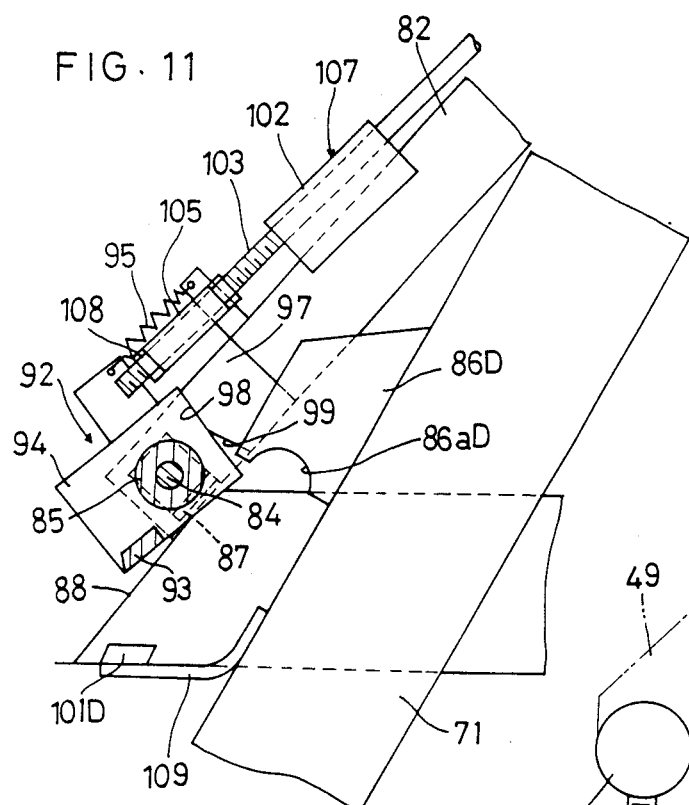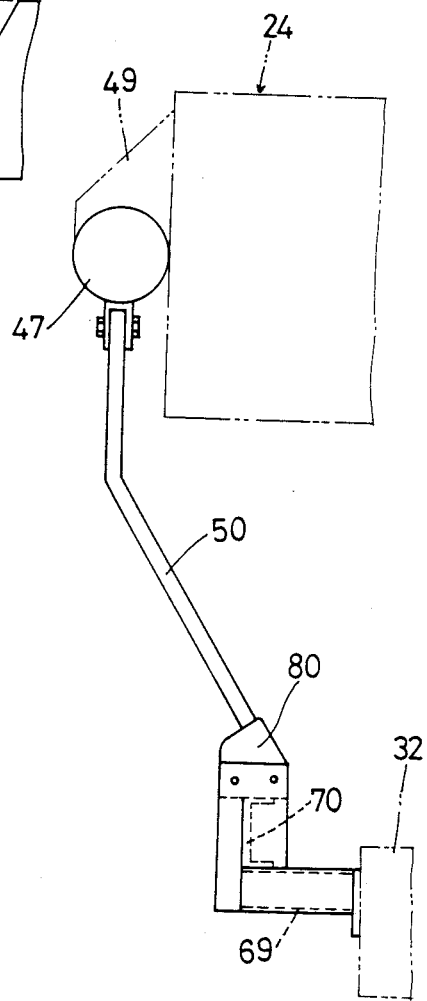

DUMPING APPARATUS FOR GRASS CATCHER

BACKGROUND OF THE INVENTION

The present invention relates to a dumping apparatus for a grass catcher for rearwardly inclining the grass catcher containing grass clippings to discharge the grass clippings.

A mower for cutting lawns, other grass and the like comprises a grass cutting unit mounted at a lower front position or a lower center position of a vehicle body, a grass catcher at an upper rear position, and duct means for delivering grass clippings from the cutting unit to the grass catcher. The grass catcher is supported by the vehicle body through a dumping apparatus which, when the grass catcher is full of grass clippings, causes the grass catcher to incline rearwardly to discharge the grass clippings onto a truck deck or the ground.

For transferring grass clippings to a position at a higher level than the vehicle body, for example, to a truck deck, the grass catcher in a grass receiving posture on the vehicle body must be lifted upwardly and rearwardly and then inclined. The dumping apparatus for lifting and inclining the grass catcher is well known and is disclosed in U.S. Pat. No. 4,487,007.

The apparatus disclosed in the above patent comprises a pair of extendible and retractable means for extension upwardly and rearwardly from right and left positions of a vehicle body. The extendible and retractable means each includes a movable member, and a lower rear position of a grass catcher is pivoted on an upper end of the movable member. A flexing link is provided between the grass catcher and a guide member of each of the extendible and retractable means. This flexing link is extendible and foldable by a hydraulic cylinder. When the hydraulic cylinder is extended, the flexing link is extended which imparts a drive to the extendible and retractable means to lift the grass catcher upwardly and rearwardly. The grass catcher is inclined as a result of an extension of the flexing link after the movable member is fully extended.

In the prior art noted above, the flexing link is flexed by causing one of two interconnected link elements to be pivoted by the hydraulic cylinder, and the pivotal movement of the link element is converted into a linear sliding movement of the movable member. Therefore, strain tneds to occur between the movable member and the guide member, which inpeds smooth vertical movement of the grass catcher. This arrangement requires powerful hydraulic cylinders and high cost compared with the case of directly driving the grass catcher with hydraulic cylinders. Moreover, when the grass catcher is inclined at an elevated position, the movable member of the extendible and retractable means may be subjected to a downwardly pressing force due to the shift in the fore and aft direction of the center of gravity of the grass catcher. Since the movable member is not positionally limited in the downward direction, it may then be difficult to maintain the grass catcher in the elevated position. Futhermore, since the grass catcher is supported only at the lower rear positions thereof by the movable members during the ascent, there is the problem that the grass catcher may not be maintained in the horizontal posture stably.

The object of the present invention is to provide a dumping apparatus capable of vertically moving the grass catcher smoothly and inclining the grass catcher rearwardly through a large angle, and of supporting the grass catcher stably and solidly at times of vertical movement and inclination.

SUMMARY OF THE INVENTION

In order to achieve the above object, according to the present invention, a dumping apparatus is provided for a grass catcher, wherein the grass catcher for collecting grass clippings delivered from a grass cutting unit through duct means, is mounted in a horizontal posture at an upper rear position of a vehicle body, the grass catcher being liftable and tiltable rearwardly by raising a forward part thereof higher than a rear part to discharge the grass clippings conctained therein, the dumping apparatus comprising:

a lifting mechanism including a pair of right and left guide members fixed to and extending rearwardly and upwardly from rear positions of the vehicle body, and a movable member mounted in each of the guide members to be rearwardly and upwardly extendible and retractable;

a bracket fixed to a rear surface of the grass catcher, the bracket having an intermediate portion and a pivotable connection connecting the intermediate portion through a horizontal axis with an upper end of the movable member for pivotal movement of the bracket towards and away from the movable member, the bracket including a contact portion at a lower forward end thereof for detachably contacting a member of the lifting mechanism to maintain the grass catcher in the horizontal posture; and a dumping mechanism including a hook attached to each of the guide members, and a pair of right and left restraining members each having an upper end connected through a pivot axis to an upper rear position of the bracket, and an engaging element at a lower end thereof upwardly movable, with the extension of the movable member, along each of the guide members into engagement with the hook, whereby rearward and upward extension of the movable member from the state where the engaging element is in engagement with the hook causes pivotal movement of the bracket about the pivot axis to pivot the lower forward end of the bracket upwardly and outwardly from between the restraining members.

With the above-described construction, the grass catcher is disposed at an upper rear position of the vehicle body for receiving grass clippings cut by the grass cutting unit mounted at a lower position of the vehicle body and delivered through the duct means. When the grass catcher is full of grass clippings, the lifting mechanism is actuated to carry out a lifting and dumping operation to discharge the grass clippings rearwardly.

The grass catcher carries the brackets fixed to a rear surface thereof, each bracket being pivoted to a movable member through the horizontal axis. The bracket includes the roller at a lower forward position thereof in rotatable contact with the guide member. In this horizontal posture, the grass catcher receives the grass clippings.

When the lifting mechanism is actuated to extend the movable member from the guide member upwardly and rearwardly, the grass catcher begins to rise while maintaining its horizontal posture. When the grass catcher reaches a position for discharging the grass clippings, the retaining member pivoted to the upper rear position of the bracket has an engaging element at a lower end thereof engaging the upper hook provided on the grass catcher to limit upward movement of the upper rear position of the bracket. As the movable member is moved further upward, the bracket makes a pivotal movement about the upper rear position with a lower forward position raised by the dumping mechanism, whereby a dumping operation is carried out. In case the grass catcher is to be accommodated, the above operations are effected in the reverse order.

The extendible and contractable lifting mechanism extending rearwardly and upwardly from the vehicle body has the movable member which per se is driven to extend and retract. Accordingly, the grass catcher is raised and lowered smoothly without straining the lifting mechanism. The restraining member of the dumping mechanism provides the pivotal point for inclining brackets to allow the grass catcher to take a dumping action with the extension of the lifting mechanism. This is effective to incline the grass catcher smoothly to a great degree and to support the inclining grass catcher stably. Further, since the bracket pivoted to the movable member is supported at the lower forward end thereof by the guide member or the movable member, the grass catcher is stably retained in the horizontal posture at the grass collecting time and the lifting time. These features assure support of a large capacity grass catcher and discharge of grass clippings with increased reliability.

According to one preferred embodiment of the present invention, the dumping apparatus further comprises a return swinging mechanism including an abutment located adjacent and below the hook on the guide member and a stopper element provided at a lower position of each of the restraining members for engagement with the abutment from above to limit downward movement of the restraining member, the stopper element being engageable with the abutment when the center of gravity of the grass catcher moves rearwardly of the horizontal axis at the upper end of movable member, to cause the bracket to pivot back with the retraction of the movable member.

With this arrangement, when the center of gravity G of the grass catcher moves, with a pivotal motion thereof, rearwardly of the horizontal axis, a pulling-down force acts on the restraining member. With this movement, the abutment disposed adjacent the lower position of the hook on the guide member engages with the stopper element attached to the lower position of the restraining member thereby limiting the descent of the restraining member. Also, in the contracting operation of the lifting mechanism succeeding thereto, the grass catcher is caused to pivot to assume the horizontal posture again.

According to a further embodiment of the present invention, the return swinging mechanism includes the stopper element rotatably mounted at a lower end of the restraining member through a cross axis, a claw provided at a lower edge of the stopper element to be movable by rotation of the stopper element between postures for engagement and non-engagement with the abutment, an urging element mounted between the stopper element and the restraining member for urging the stopper element to the non-engagement posture, and interlocking means mounted between the stopper element and the bracket for transmitting the pivotal movement of the bracket to the stopper element to rotate the stopper element to the engagement posture when the center of gravity G of the grass catcher moves rearwardly of the horizontal axis.

With this arrangement, the engagement and the non-engagement of the stopper element attached to the lower edge of the restraining member associated with the operational condition of the grass catcher is normally maintained at the non-engagement side by means of the urging element. On the other hand, when the center of the gravity of the grass catcher moves rearwardly of the horizontal axis, this may be readily controlled by the interlocking means depending on the pivotal condition of the bracket (grass catcher). Consequently, the invention has provided the grass catcher with necessary and sufficient features by such simple mechanism.

BRIEF DESCRIPTION OF THE DRAWINGS

The drawings illustrate an embodiment of the present invention, in which;

FIG. 7 is a sectional side view of an engaging element, a stopper element and other components at a grass dumping time, FIG. 8 is a sectional side view of the stopper element and an interlocking device at a time of return swinging, FIG. 11 is a side view showing a relationship among an engaging element, a lower hook and an engagement preventing element, and FIG. 12 is a front view of a duct supporting device.

DESCRIPTION OF THE PREFERRED EMBODIMENT

An embodiment of the present invention will be described hereinafter with reference to the drawings.

Figure 1:
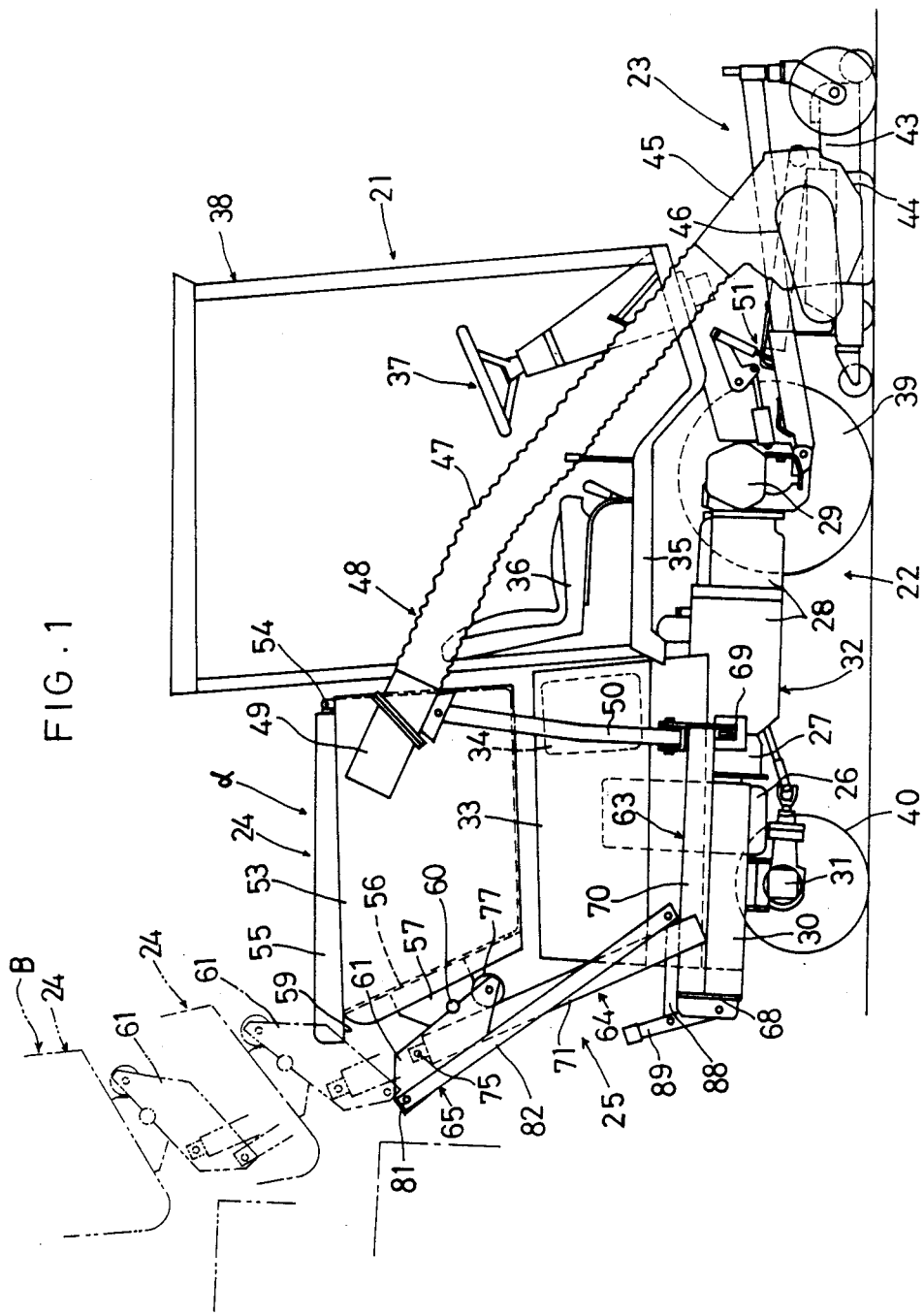
FIG. 1 is a side elevation of a mower equipped with the dumping apparatus.

FIG. 1 shows a mower 21 for carrying out a series of operations including mowing lawns, other grass and the like, and collecting and discharging resultant clippings.

The mower 21 comprises, as main components thereof, a self-propelled vehicle 22, a grass cutting unit 23 mounted on a front position thereof, a grass catcher 24 mounted on a rear upper potrion thereof, and a dumping apparatus 25 for connecting the grass catcher 24 to the vehicle 22 so as to enable a dumping operation.

The vehicle 22 has a vehicle body 32 of substantially integral construction which includes an engine 26, a clutch housing 27, a transmission case 28 and a front differntial 29 directly connected to one another, and supports a rear differential 31 through a rear axle frame 30 rearwardly of the engine 26. The engine 26 is covered by a hood 33 which encloses a fuel tank 34. The transmission case 28 is covered by a driver's deck 35 which carries a driver's seat 36 and a steering wheel 37 forwardly thereof. Further, a four-strut protective frame 38 covering the driver's seat 36 and steering wheel 37 is fixed to the deck 35.

The transmission case 28 contains a hydraulic stepless transmission for transmitting engine power to front wheels 39 by way of the front differential 29, and to steerable rear wheels 40 by way of the rear differential 31. The engine power is also transmitted to the grass cutting unit 23 by way of a PTO shaft and a transmission shaft.

The grass cutting unit 23 includes one or more cutting blades rotatable on a vertical axis for cutting grass and transmitting grass clippings to one lateral side thereof. The grass clippings are discharged through a grass outlet defined in a lateral side of a cutter deck 43. The grass outlet is provided with a casing 45 of delivery means 44. The casing 45 houses a vane wheel rotatable on a horizontal axis. The power for rotating the cutting blades is branched off and transmitted through a transmission case 46 for rotating the vane wheel, whereby the grass clippings are scattered and fed into a duct 47 together with blasts of air.

The duct 47 of duct means 48 is formed of a flexible hose and is constantly connected to the casing 45 of delivery means 44, with an upper rear end thereof detachably connected to an intake opening 49 of the grass catcher 24. The duct 47 is supported at the upper rear end thereof by the vehicle body 32 through a stay 50.

The grass cutting unit 23 is vertically movably attached to a lower front position of the vehicle body 32 through a mounting means 51. However, the grass cutting unit 23 may be attached through a mounting means to a lower center position of the vehicle body 32 between the front and rear wheels 39 and 40. Further, although the delivery means 44 is disposed at one lateral side of the cutter deck 43, the cutting unit 23 may be the rearwardly discharging type with the delivery means 44 connected to a rear center position of the cutter deck 43.

Figure 2:
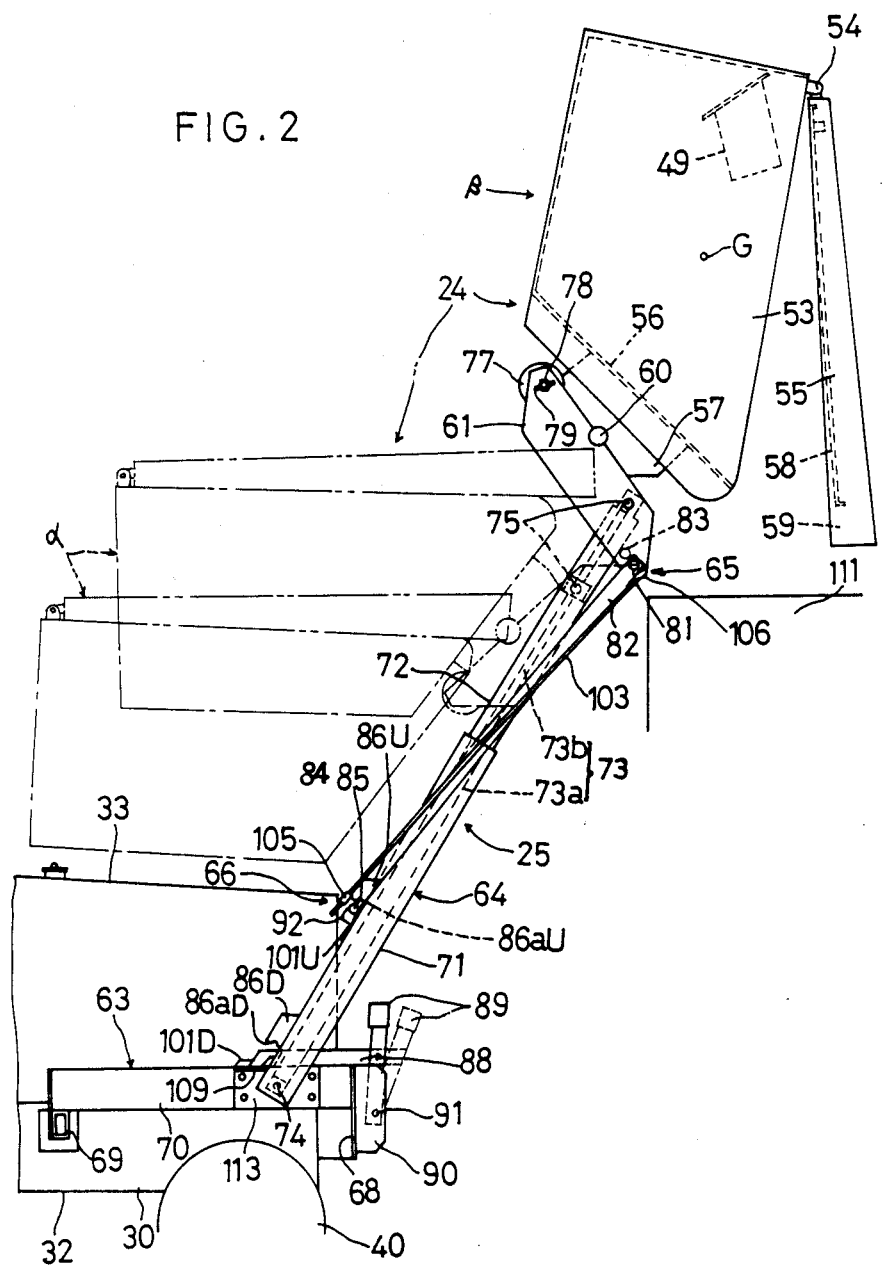
FIG. 2 is a side view of a dumping apparatus at a time of grass disposal at a high position.
Figure 3:
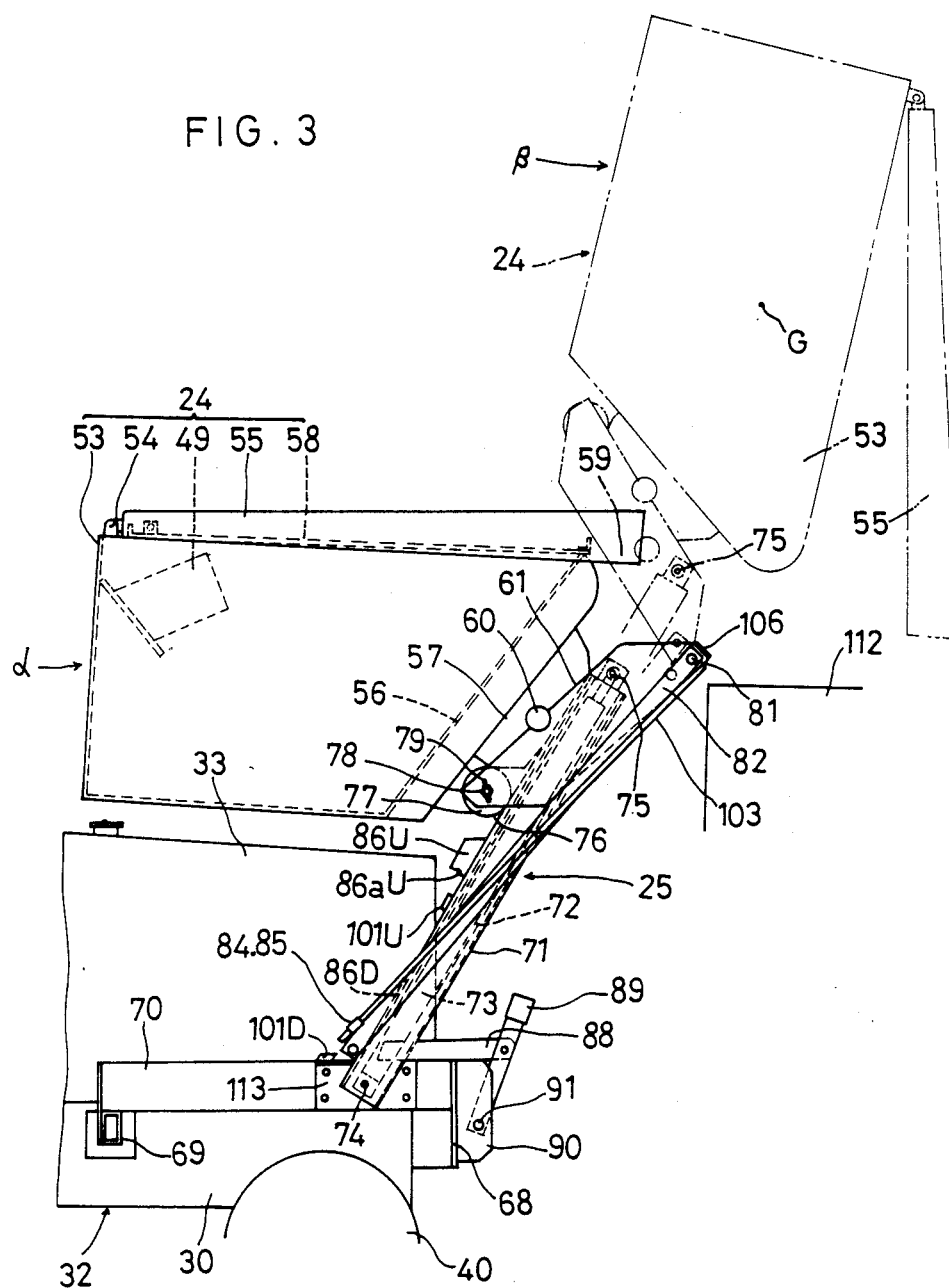
FIG. 3 is a side view of the dumping apparatus at a time of grass disposal at a low position.
Figure 4:
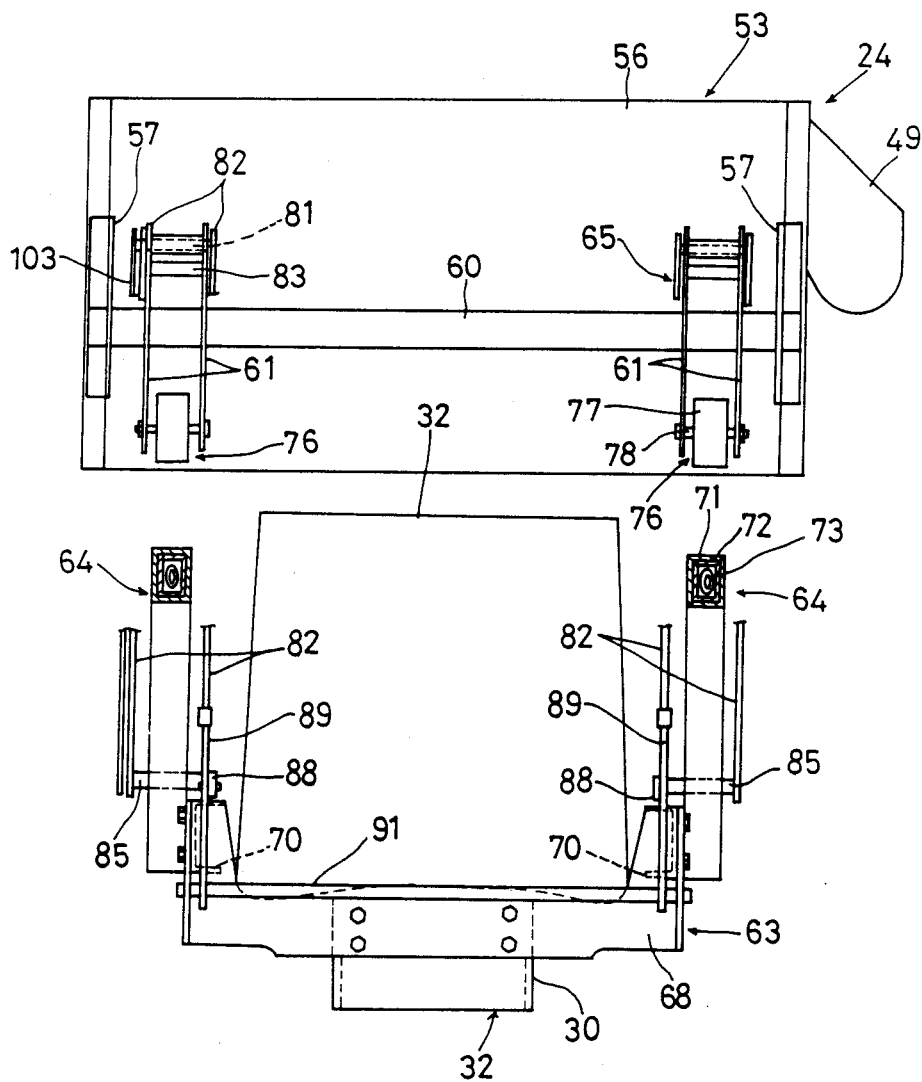
FIG. 4 is a partly sectional rear view of the dumping apparatus.

In FIGS. 1 through 12, the grass catcher 24 includes a box member 53 opening at the top in a horizontal posture α as shown in FIGS. 1 and 3, and a lid 55 attached to the box member 53 to be openable and closable through pivot pins 54. The box member 53 has the intake opening 49 at one lateral wall thereof, and its rear wall 56 is inclined rearwardly and upwardly. A pair of right and left mounting plates 57 are welded or bolted to the rear wall.

The lid 55 has a filter 58 opposed to a top face of the box member 53 and an air outlet 59 located at a lower rear part thereof when in a closed position. Thus, the filter 58 prevents discharge of grass clippings delivered into the box member 53, with only air being discharged, through the air outlet 59. The filter 58 is formed of wire netting or the like, and is pivotably supported at a forward end and engaged at a rear end thereof by the lid 55, whereby the filter 58 is pivotably supported to allow interior surface of the lid to be cleaned.

Rearwardly of the grass catcher 24 is a mounting bar 60 fixed to the right and left mounting plates 57. The mounting bar 60 carries brackets 61 each formed of a pair of plates and fixed to opposite right and left positions thereof, respectively. The right and left brackets 61 are parallelogram-shaped in side view.

The dumping apparatus 25 comprises, as main components thereof, a platform 63, a pair of right and left lifting mechanisms 64, the above-mentioned brackets 61, dumping mechanisms 65 and return swinging mechanisms 66.

As shown in FIGS. 2 through 4 and 12, the platform 63 includes a rear plate 68 bolted to a rear end of the rear axle frame 30, a pair of front support elements 69 bolted to right and left lateral sides of the clutch housing 27 or the transmission case 28, respectively, and side members 70 extending between the rear plate 68 and right and left front support elements 69. The side members 70 are formed of channel elements, which are disposed outwardly of the hood 33 and extend longitudinally of the vehicle body 32. A mounting deck 80 is fixed to one of the right and left front support elements 69, and the duct supporting stay 50 is erected on the mounting deck 80.

Each of the right and left lifting mechanisms 64 has a double pipe construction including a guide member 71 and a movable member 72, with a hydraulic cylinder 73 mounted inside. The guide member 71 is formed of a square pipe, and includes a plate element 113 welded to a lower position thereof, the plate element 113 being bolted to an outer surface of the side member 70. Thus, the guide member 71 is fixed to the vehicle body 32 through the platform 63. The guide member 71 is inclined rearwardly so as to extend upwardly and rearwardly. The movable member 72 is also formed of a square pipe which is slidably inserted into the guide member 71 to be extendible and retractable rearwardly and upwardly with respect to the guide member 71.

The hydraulic cylinder 73 is operable by pressure oil supplied by a hydraulic pump driven by the engine 26 of the vehicle 22. The hydraulic cylinder 73 includes a main cylinder body 73a connected at a lower end thereof by an attaching pin 74 to a lower end of the guide member 71, and a piston rod 73b connected at an upper end thereof by a horizontal axis 75 to an upper end of the movable member 72 and also to the bracket 61. The hydraulic cylinder 73 acts to extend and retract the movable member 72, and the movable member 72 protects the precision-finished piston rod 73b from damage and dust. The double pipe construction of guide member 71 and movable member 72 with the hydraulic cylinder 73 contained therein allows the lifting mechanism 64 to be strong and operable smoothly.

The horizontal axis 75 extends through the upper ends of movable member 72 and piston rod 73b and the bracket 61, and supports the bracket 61 to be pivotable fore and aft at the upper end of movable member 72. The horizontal axis 75 extends through the bracket 61 at an upper position thereof intermediate longitudinally of the bracket 61.

Each of the right and left brackets 61 has a roller 77 mounted through an axis 78 at a lower forward position thereof. The roller 77 defines a contact portion 76 disengageably in contact with the lifting mechanism 64. The roller 77 contacts the guide member 71 when the movable member 72 is retracted, and rolls on the guide member 71 into contact with the movable member 72 as the movable member 72 is extended. The bracket 61 is supported by the lifting mechanism 64 at two positions, i.e. through the roller 77 in contact with the lifting mechanism 64 and through the horizontal axis 75, whereby the grass catcher 24 is stabilized in the horizontal posture α shown in FIGS. 1 and 3.

When the grass catcher 24 is in the horizontal posture α and at a lowermost position, it is in a grass collecting posture with the intake opening 49 connected to the duct 47. As the movable member 72 is extended, the grass catcher 24 remaining in the horizontal posture α moves away from the duct 47 and rises as far as to a position shown in two dots and dash lines in FIG. 2. A base may be provided on the hood 33 for receiving a forward part of the grass catcher 24 in the grass collecting posture.

The axis 78 on which the roller 77 is mounted extends through slots 79 defined in the bracket 61 and is fixed by bolts or the like. Thus, the axis 78 is positionally adjustable within the range determined by the slots 79, thereby allowing adjustment of the posture of grass catcher 24. The slots 79 may be linear but should preferably be formed to have an arcuate shape extending about the horizontal axis 75.

The roller 77 preferably serves as the contact portions 76 for maintaining the grass catcher 24 in the horizontal posture because the roller presents small frictional resistance. However, an arcuate plate member may be employed instead, and disposed in slidable contact with the guide member 71.

Upwardly and rearwardly of the horizontal axis 75 of each of the right and left brackets 61 is a pivot axis 81 parallel to the horizontal axis 75. Upper ends of a pair of right and left restraining members 82 are connected to opposite ends of this pivot axis 81. A stopper pin 83 is fixed to a position below the pivot axis 81.

The restraining members 82 form part of the dumping mechanism 65, and carry a cylindrical engaging element 85 fitted on a cross axis 84 mounted at lower ends thereof. The pivot axis 81 is disposed rearwardly of the lifting mechanism 64 whereas the cross axis 84 is disposed forwardly thereof. The lower ends of the restraining members 82 are free ends. Accordingly, the engaging element 85 slides along a forward face of guide member 71 when the movable member 72 is raised and lowered. The engaging element 85 defines an engaging portion, and is engageable with a hook element 86 formed on the forward face of the guide member 71.

The hook element 86 defines a hook 86a in the shape of a semicircular recess in a lower face of a plate element having an approximately trapezoidal shape in plan view. The engaging element 85 engages the hook 86a from below. The hook element 86 has an upper surface inclined forwardly and downwardly relative to the guide member 71 so that the engaging element 85 in downward movement will not engage it.

Figure 5:
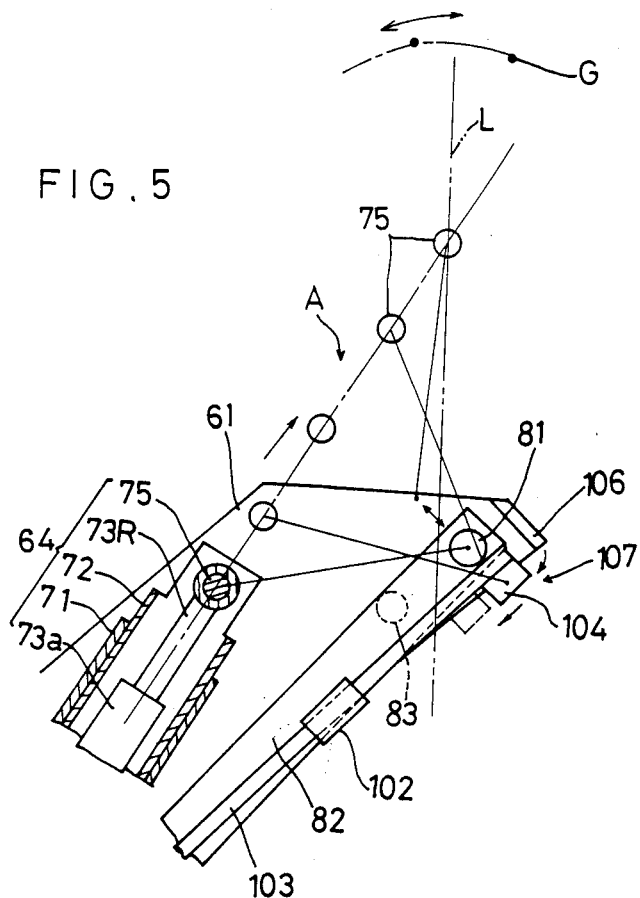
FIG. 5 is an explanatory view of an operative relationship among a movable member, a bracket and a restraining mechanism.
Figure 10:
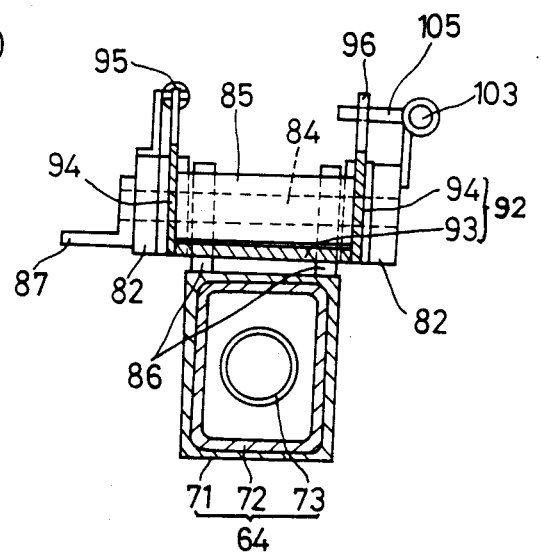
FIG. 10 is a section taken on line C—C in FIG. 9.

The hook element 86 is provided at two, upper and lower positions on the guide member 71. When the engaging element 85 engages either one of upper and lower hooks 86aU and 86aD, the restraining members 82 are held against upward movement. When in this state the movable member 72 moves upward, the restraining members 82 make a swinging motion about the hook 86a as shown in FIG. 5, and restrain upward movement of the upper rear end of bracket 61. Consequently, the pivot axis 81 acts as a pivotal point, and the bracket 61 tilts rearwardly with the lower forward end thereof rising above the upper rear end, whereby the grass catcher 24 takes a dumping action rearwardly as shown in FIGS. 2 and 3.

The lid 55 of the grass catcher 24 is openable and closable by gravity. The lid 55 remains closed until the top opening of the box member 53 rises from the horizontal posture $\alpha$ to a substantially vertical posture. When the opening is in a rearwardly inclined posture $\beta$, the lid 55 opens depending from the pivot pins 54 to discharge grass clippings.

Referring to FIGS. 2 through 4 and FIGS. 9 and 11, a projecting element 87 formed of an L-shaped plate is fixed laterally of the engaging element 85 at the lower end of each of the right and left restraining members 82.

An engagement preventing element 88 is disposed rearwardly of the projecting element 87 to be engageable with the projecting element 87. The engagement preventing element 88 has a rear end connected to a lever 89.

The right and left levers 89 are fixed to a shaft 91 pivotably supported by support plates 90 fixed to the rear plate 68. The engagement preventing element 88 is movable in the fore and aft direction as mounted on the side member 70 by pivoting each lever 89. When the engagement preventing element 88 is moved forwardly of the lower hook 86aD into engagement with the projecting element 87, the projecting element 87 is oscillated with the restraining members 82 about the pivot axis 81, thereby moving the engaging element 85 away from a position engageable with the lower hook 86aD to prevent engagement between these elements.

The engagement preventing element 88 may be maintained in the forward position to prevent the engaging element 85 and the lower hook 86aD from engaging each other. The forward end of the engagement preventing element 88 defines an inclined surface at substantially the same angle as the guide member 71, to allow the engaging element 85 to smoothly mount the forward face of the lower hook element 86D when the restraining members 82 move upward.

The cross axis 84 at the lower ends of restraining members 82 carries a stopper element 92 forming part of the return swinging mechanism 66. This stopper element 92 includes a claw 93 and opposite lateral walls 94. The lateral walls 94 are rotatably supported by opposite ends of the engaging element 85 or by the cross axis 84. A tension spring 95 as an urging element is mounted between one of the lateral walls 94 and one of the restraining members 82. The other lateral wall 94 has a tongue 96 projecting therefrom.

A posture setting element 97 is mounted on at least one of opposed inside surfaces of the two band plates defining the restraining members 82. The posture setting element 97 has an angled surface opposed to the stopper element 92, to define a non-engagement posture setting portion 98 and projecting element 87 for contacting the side wall 94. The stopper element 92 contacts the non-engagement posture setting portion 98 when pulled by the tension spring 95. At this time, the claw 93 is separated from the guide member 71 and retained in a position out of engagement with an upper abutment 101U (FIG. 7). When the stopper element 92 is turned from this posture against the spring 95, the stopper element 92 contacts the engaging posture setting portion 99 with the claw 93 contacting the guide member 71 and retained in a position engageable with the upper abutment 101U (FIG. 8).

Two of the above-mentioned abutments 101 are disposed below the upper and lower hook elements 86U and 86D, respectively. The upper abutment 101U is mounted on the guide member 71, whereas the lower abutment 101D is mounted on a plate 109 projecting from the guide member 71.

An interlocking rod 103 is longitudinally slidably supported through a support tube 102 outwardly of one of the restraining members 82. The interlocking rod 103 carries a pushed element 104 and a pushing element 105 at upper and lower ends thereof, respectively. The bracket 61 includes a projection 106 for pushing the pushed element 104. These components constitute an interlocking device 107 of the return swinging mechanism 66.

Figure 6:
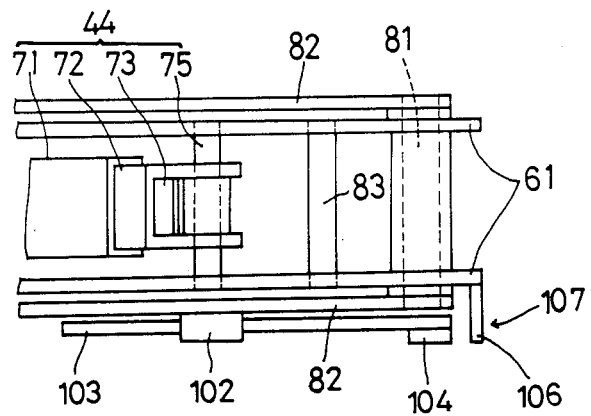
FIG. 6 is a view taken in the direction of arrow A in FIG. 5.
Figure 9:
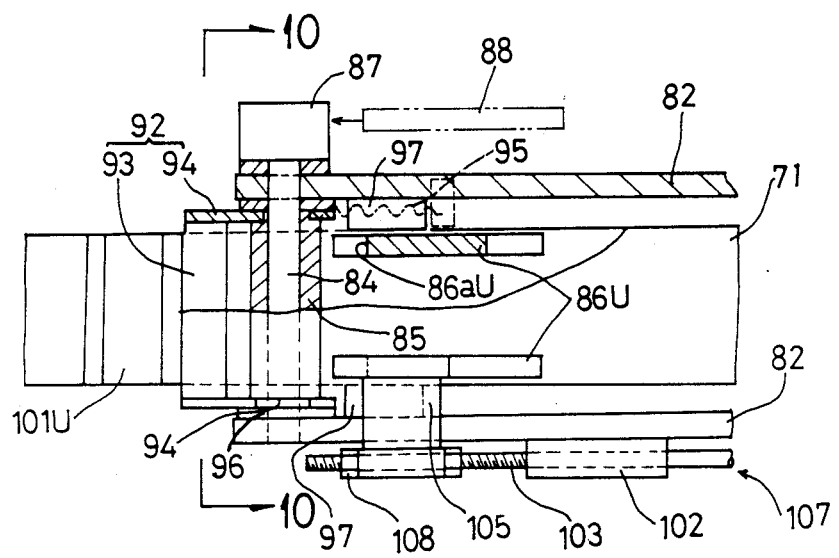
FIG. 9 is a partially sectional view taken in the direction of arrow B in FIG. 7.

Referring to FIGS. 2, 5 and 6, the pushed element 104 is fixed to the interlocking rod 103 and the projection 106 to the bracket 61. When the center of gravity G of the grass catcher 24, in taking a dumping action, moves rearwardly past a vertical line L crossing the horizontal axis 75, the bracket 61 in pivotal motion causes the projection 106 to contact and push the pushed member 104 downwardly thereby lowering the interlocking rod 103.

Referring to FIGS. 7 through 10, the pushing member 105 is fitted at a lower position of the interlocking rod 103 and fixed thereto by a nut 108, and thus the pushing member 105 is positionally adjustable longitudinally of the interlocking rod 103. The pushing member 105 is opposed to the tongue 96 of the stopper element 92. When the interlocking rod 103 is moved downward, the pushing member 105 contacts and pushes the tongue 96 thereby rotating the stopper element 92 against the spring 95.

The return swinging mechanism 66 begins a preparatory operation when the grass catcher 24 is inclined rearwardly for a dumping action and its center of gravity G is about to move rearwardly past the horizontal axis 75, and completes the preparatory operation when the stopper pin 83 engages the movable member 72 thereby stopping the reaward inclination of the grass catcher 24. When the preparatory operation is completed, the stopper element 92 is in contact with the engagement posture setting portion 97 and the claw 93 is engaged or in a position engageable with the abutment 101.

When the movable member 72 is contracted in this state, the claw 93 is in full contact with the abutment 101 to prevent downward movement of the restraining members 82 and to allow the grass catcher 24 to pivot back with the pivot axis 81 acting as the pivotal point for the return pivoting of the bracket 61. The pivot axis 81 acts as the pivotal point only while the center of gravity G is located rearwardly of the horizontal axis 75. When the center of gravity G moves forwardly of the horizontal axis 75, the weight of grass catcher 24 causes the bracket 61 to slant forwardly about the horizontal axis 75. As a result, the restraining members 82 are pulled upward, thereby separating the claw 93 from the abutment 101, with the engaging element 85 engaging the hook 86a again, and the grass catcher 24 is returned to the horizontal posture a. When the bracket 61 pivots back, the interlocking device 107 becomes inoperative. Consequently, the stopper element 92 engages the non-engaging posture setting portion 98 under the action of spring 95, whereby the claw 93 in descent is kept out of engagement with the abutment 101U.

The interlocking device 107 may have the pushed element 104 positionally adjustable in the longitudinal direction of interlocking rod 103 as is the pushing element 105. Further, the interlocking device 107 may comprise a push-pull wire, with one end of an inner wire pushable by the projection or tongue 106 and the other end acting to push the tongue 106.

Next, functions of the above construction will be described.

Referring to FIG. 2, the grass catcher 24 is disposed at the upper rear position of the vehicle body 32 for receiving grass clippings cut by the grass cutting unit 23 mounted at the lower position of the vehicle body and delivered by the feed means 44 and the duct means 48. When the grass catcher 24 is full of grass clippings, the hydraulic cylinders 73 of the lifting mechanism 64 are actuated to carry out a lifting and dumping operation to discharge the grass clippings rearwardly.

The grass catcher 24 carries the brackets 61 fixed to a rear surface thereof, each bracket 61 being pivoted to the movable member 72 through the horizontal axis 75. The bracket 61 includes the roller 77 at a lower forward position thereof in rotatable contact with the guide member 71. In the illustrated horizontal posture, the grass catcher 24 receives the grass clippings. When the grass catcher 24 is in the horizontal posture (shown in a solid line in FIG. 3), the grass discharge opening is located on top, and blasts entraining the grass clippings from the feed means 44 pass through the filter 58 at the opening and exit from a rear end of the openable and closable lid 55.

When the hydraulic cylinders 73 are actuated to extend the movable member 72 from the guide member 71 upwardly and rearwardly, the grass catcher 24 is lifted as shown in a two dots and dash line in FIG. 2. Then, the roller 77 moves along the guide member 71 into contact with the movable member 72 while maintaining the grass catcher 24 in the horizontal posture.

When the grass catcher 24 reaches the position for discharging the grass clippings onto a truck deck 111 or the like, the restraining member 82 pivoted to an upper rear position of the bracket 61 has an engaging element at a lower end thereof engaging an upper hook 86aU provided on the grass catcher 24 to limit upward movement of the upper rear position of bracket 61. As the movable member 72 is moved further upward, the bracket 61 makes a pivotal movement about the upper rear position with a lower forward position raised, whereby the grass catcher 24 becomes inclined rearwardly.

The lid 55 of the grass catcher 24 is pivoted at a forward end thereof to the box member 53, and remains closed until the discharge opening at the top of the box member 53 changes from the horizontal posture to a substantially vertical posture. When the discharge opening is beyond the substantially vertical posture, the lid is opened with the grass catcher 24 assuming a rearwardly inclined posture (shown in a solid line in FIG. 2), to discharge the grass clippings contained therein.

The grass catcher 24 in the dumping operation is inclined until its center of gravity G moves rearwardly past the horizontal axis 75 at the upper end of the movable member 72 in order to assure complete disposal of the grass clippings. The rearward inclination is ultimately stopped by the stopper pin 83 of bracket 61 coming into contact with the movable member 72.

The bracket 61 includes the projection 106 which contacts the pushed element 104 at the upper end of the interlocking rod 103 before the center of gravity G of grass catcher 24 moves rearwardly past the horizontal axis 75. Consequently, the interlocking rod 103 is caused to slide longitudinally of the restraining member 82, whereby the pushing element 105 mounted at the lower end of the rod 103 moves the stopper element 92 pivoted to the lower end of the restraining member 82 from a non-engaging posture to an engaging posture.

The restraining member 82 is subjected to an upwardly pulling force when the center of gravity G of grass catcher 24 is at a position forwardly of the horizontal axis 75 and to a downwardly pressing force when the center of gravity G shifts rearwardly. Consequently, the restraining member 82 is slightly lowered by the rearward shifting of the center of gravity G. However, its downward movement is limited by the engagement between the stopper element 92 in the engaging position and the upper abutment 101U on the grass catcher 24 (as shown in FIG. 8).

When the movable member 72 is retracted to cause the grass catcher 24 to pivot back after the grass disposal, the bracket 61 begins to incline forwardly about the pivot axis 81 at the upper end of the restraining member 82 which is positionally restricted by the upper abutment 101U. As the center of gravity G of grass catcher 24 moves forwardly past the horizontal axis 75, the restraining member 82 is slightly pulled upward to bring the stopper element 85 into contact with the upper hook 88aU again. Thus, the horizontal axis 75 acts as the pivotal point until the grass catcher 24 assumes the horizontal posture.

The grass catcher 24 is allowed to rise and take the dumping action as described above by projecting the engagement preventing element toward the lower hook 86aD. If the engagement preventing element is retracted, the engaging element 85 engages the lower hook 86aD and the dumping action is taken without substantially raising the grass catcher 24 from the grass receiving position. The return swinging is effected in this case with the stopper element 92 contacting the lower abutment 101D. Thus, the grass clippings are quickly discharged onto a low level truck deck 112 or the ground as shown in a two dots and dash line in FIG. 3.

The present invention is not limited to the foregoing embodiment but may be modified in various ways.

What is claimed is:

1. A dumping apparatus for a grass catcher wherein the gras catcher, for collecting grass clippings delivered from a grass cutting unit through duct means, is mounted in a horizontal posture at an upper rear position of a vehicle body, the grass catcher being liftable and tiltable rearwardly by raising a forward part thereof higher than a rear part to discharge the grass clippings contained therein, said dumping apparatus comprising:

a lifting mechanism including a pair of right and left guide members fixed to and extending rearwardly and upwardly from rear positions of the vehicle body, and a movable member mounted in each of the guide members to be rearwardly and upwardly extendible and retractable;

a bracket fixed to a rear surface of said grass catcher, said bracket having an intermediate portion and a pivotable connection connecting said intermediate portion through a horizontal axis with an upper end of the movable member for pivotal movement of said bracket towards and away from said movable member, said bracket including a contact portion at a lower forward end thereof for detachably contacting a member of said lifting mechanism to maintain the grass catcher in the horizontal posture; and a dumping mechanism including a hook attached to each of said guide members, and a pair of right and left restraining members each having an upper end connected through a pivot axis to an upper rear position of said bracket, and an engaging element at a lower end thereof upwardly movable, with the extension of said movable member, along each of said guide members into engagement with said hook, whereby rearward and upward extension of said movable member from the state where the engaging element is in engagement with said hook causes pivotal movement of said bracket about said pivot axis to pivot the lower forward end of said bracket upwardly and outwardly from between said restraining members.

2. A dumping apparatus for a grass catcher as claimed in claim 1, wherein in said lifting mechanism, said guide members and said movable members are formed of cylindrical elements, with said movable members being slidably inserted into said guide members, each said guide member and movable member enclosing a hydraulic cylinder having a main cylinder body connected to a lower end thereof to a lower end of said guide member, and a piston rod connected at an upper end thereof to an upper end of the movable member.

3. A dumping apparatus for a grass catcher as claimed in claim 1, wherein said contact portion of the bracket is formed of a roller in rotatable contact with the member of said lifting mechanism, with a roller axis 78 supporting said roller being positionally adjustable in a direction opposed to said lifting mechanism relative to said bracket.

4. A dumping apparatus for a grass catcher as claimed in claim 1, wherein said hook of the dumping mechanism is provided at two, upper and lower positions on said guide member, an engagement preventing member being provided adjacent said lower hook for moving said engaging element away from a position engageable with said lower hook as said engagement preventing member pushes a lower portion of said restraining member.

5. A dumping apparatus as claimed in claim 1, further comprising:

a return swinging mechanism including an abutment located adjacent and below said hook on said guide member and a stopper element provided at a lower position of each of said restraining members for engagement with said abutment from above to limit downward movement of said restraining member, said stopper element being engageable with said abutment when the center of gravity G of said grass catcher moves rearwardly of said horizontal axis at the upper end of said movable member, to casuse said bracket to pivot back with the retraction of said movable member.

6. A dumping apparatus as claimed in claim 5, wherein said hook of the dumping mechanism is provided at two, upper and lower positions on said guide member, an engagement preventing member being provided adjacent said lower hook for moving said engaging element away from a position engageable with said lower hook as said engagement preventing member pushes a lower portion of said restaining member, said abutments of said return swinging mechanism being provided each of said upper and lower hooks.

7. A dumping apparatus as claimed in claim 1, wherein a stopper pin is provided at an upper rear position on said bracket for contacting said movable member to limit the pivotal movement of said bracket after the center of gravity G of said grass catcher has moved rearwardly of said horizontal axis.

8. A dumping apparatus as claimed in claim 5, wherein said return swinging mechanism includes the stopper element rotatably mounted at a lower end of said restraining member through a cross axis, a claw provided at a lower edge of said stopper element between postures for engagement and non-engagement with said abutment, an urging element mounted between said stopper element and said restraining member, and interlocking means mounted between said stopper element and said bracket for transmitting the pivotal movement of said bracket to the engagement posture when the center of gravity G of said grass catcher moves rearwardly of said horizontal axis.

9. A dumping apparatus as claimed in claim 8, wherein said interlocking means includes, an interlocking rod extending substantially alongside said restraining member and supported to be longitudinally slidable, a pushed element mounted at an upper end of said interlocking rod to be contactable by said bracket, a pushing element mounted at a lower end of said interlocking rod for pushing a tongue extending from said stopper element, at least one of said pushed element and said pushing element being positionally adjustable in the longitudinal direction of said interlocking rod.

10. A dumping apparatus as claimed in claim 8, wherein said restraining member defines an engaging posture setting portion for contacting said stopper element in the engagement posture and a non-engaging posture setting portion for contacting said stopper element in the non-engagement posture.

* * * * *